United States Patent [19]
Curll

[11] Patent Number: 5,832,689
[45] Date of Patent: Nov. 10, 1998

[54] JOINT WITH LOCKING PIN FOR CONNECTING MULTIPLE MEMBERS

[75] Inventor: Bruce Curll, Lac La Hache, Canada

[73] Assignee: Cariboo Bob Productions, Lac La Hache, Canada

[21] Appl. No.: 868,275

[22] Filed: Jun. 3, 1997

[51] Int. Cl.⁶ .................................. F04B 1/38; F16B 9/00
[52] U.S. Cl. .................. 52/656.9; 403/170; 403/219; 403/292; 403/306
[58] Field of Search ................... 52/656.9; 403/219, 403/306, 170, 292

[56] References Cited

U.S. PATENT DOCUMENTS

| | | | |
|---|---|---|---|
| 1,763,748 | 6/1930 | Best | 403/219 |
| 2,258,909 | 10/1941 | Reens | 403/219 |
| 2,982,572 | 5/1961 | Farber | 52/651.1 X |
| 3,001,750 | 9/1961 | Hedlund | 403/219 X |
| 3,509,677 | 5/1970 | Krex et al. | |
| 3,887,288 | 6/1975 | Glaser | 403/219 |
| 3,966,337 | 6/1976 | Crawford | |
| 4,825,620 | 5/1989 | Johnson | |
| 5,185,982 | 2/1993 | Hostetler | |
| 5,469,678 | 11/1995 | Zamerovsky | 52/263 |

*Primary Examiner*—Christopher Kent
*Attorney, Agent, or Firm*—Miller Nash Wiener Hager & Carlsen, LLP

[57] ABSTRACT

A joint able to join three members. The joint is formed by each member having at least one channel of a width generally equal to the thickness of a member to be joined to it and a length generally equal to the width of a member to be joined to it. There is a recess in each member positionable so that, when constructed, the joint has a pathway formed by said recesses. A locking member is received by said pathway to lock the joint.

10 Claims, 6 Drawing Sheets

JOINT WITH LOCKING PIN FOR CONNECTING MULTIPLE MEMBERS

FIELD OF THE INVENTION

This invention relates to a joint able to join three members, generally at right angles to each other.

DESCRIPTION OF RELATED ART

Joints able to join the three members together, typically at right angles to each other, are well known. There is a demand for such a joint in many circumstances.

A disadvantage with prior art joints of this nature is that if reasonable stability is to be achieved then the joint must be made permanent by the use of adhesive. While this is not a disadvantage in, for example, furniture making it is a disadvantage in the construction of modular units used, for example, for storage. It can be desirable to change the configuration of the modular unit depending on the use, for example, in storage shelfs, if the size of the article to be stored changes, if the space available for storage changes or if it is simply desired to change the appearance of the unit.

Hostetler in U.S. Pat. No. 5,185,982 describes and claims such a joint. Furthermore Hostetler has produced a stable joint by the provision of laterally extending slots formed intermediate the ends of tynes of the forks that make up the modular assembly described and claimed in Hostetler.

A disadvantage in the Hostetler structure is the necessity to form these locking slots. A joint, particularly in wood, should, in general, be formed with precision. However the forming of precise joints is time consuming. Further Hostetler appears to stabilize only in two dimensions, not three.

The present invention shares with Hostetler the use of forks that must be formed with reasonable precision. However whereas Hostetler's locking system must also be formed with reasonable precision the present invention is to a joint that is locked together by a locking system that is quickly and easily formed and locks all three members of the joint together.

SUMMARY OF THE INVENTION

Accordingly, in a first aspect, the present invention is a joint able to join three members, the joint being formed by each member having at least one channel of a width generally equal to the thickness of a member to be joined to it and a length generally equal to the width of a member to be joined to it;

a recess in each member positionable so that, when constructed, the joint has a pathway formed by said recesses; and a locking member to be received by said pathway to lock the joint.

DESCRIPTION OF PREFERRED EMBODIMENTS

Figure 1:
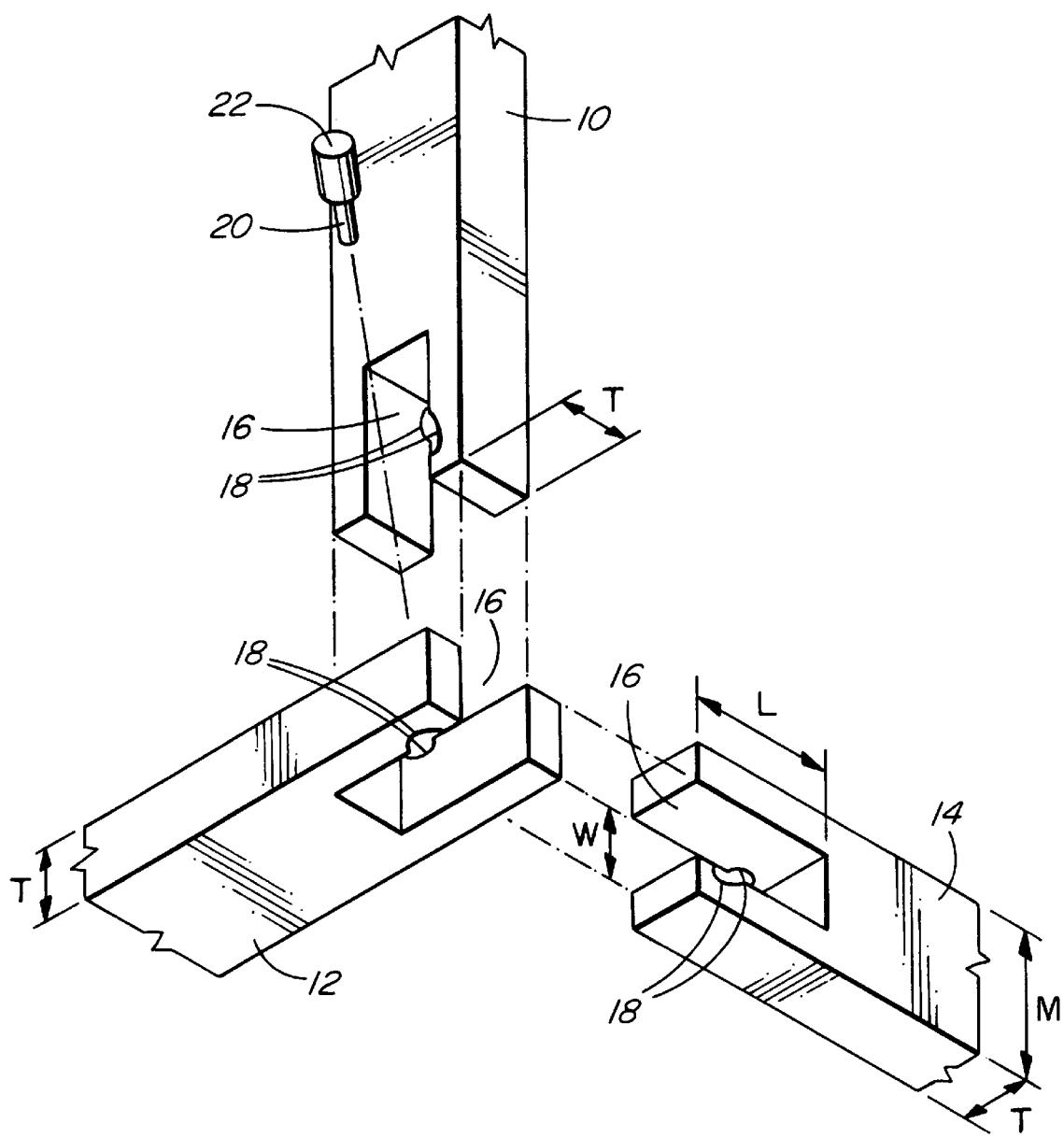
FIG. 1 is an exploded isometric view of a joint according to the present invention.
Figure 1A:
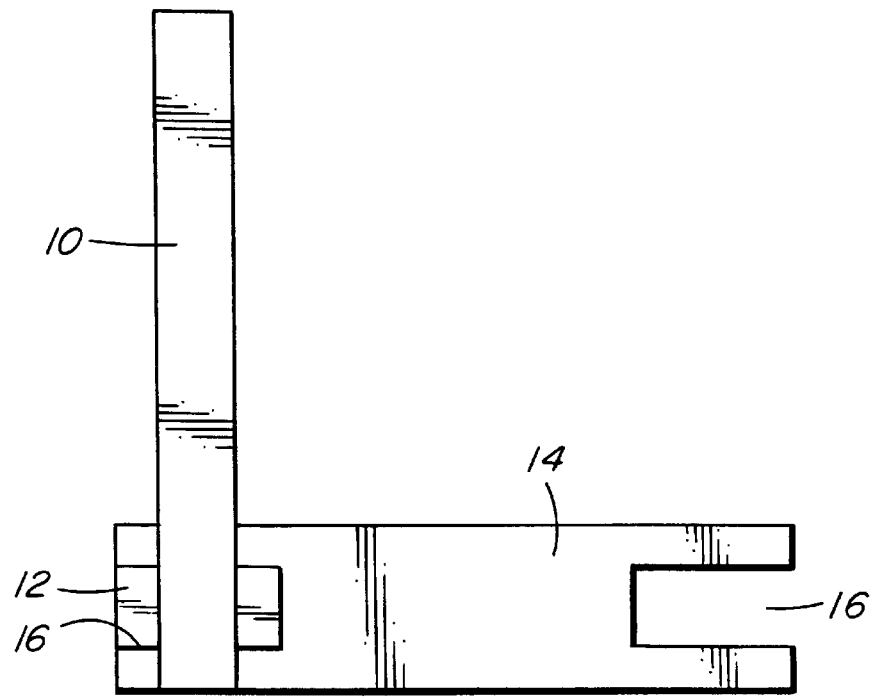
FIGS. 1a, 1b and 1c are side elevations of the joint of FIG. 1.
Figure 1B:
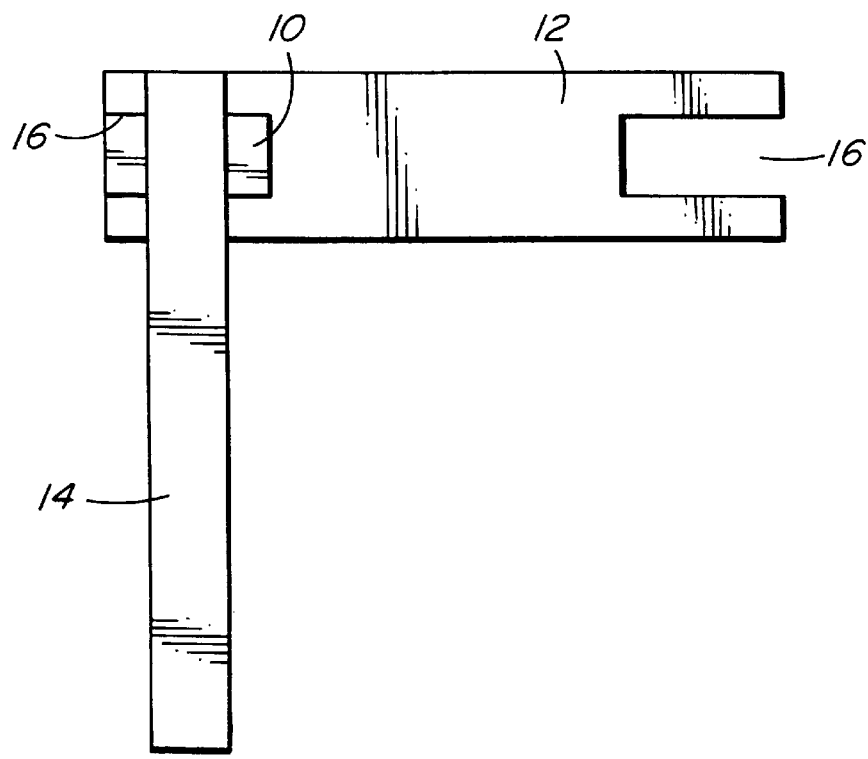
Figure 1C:
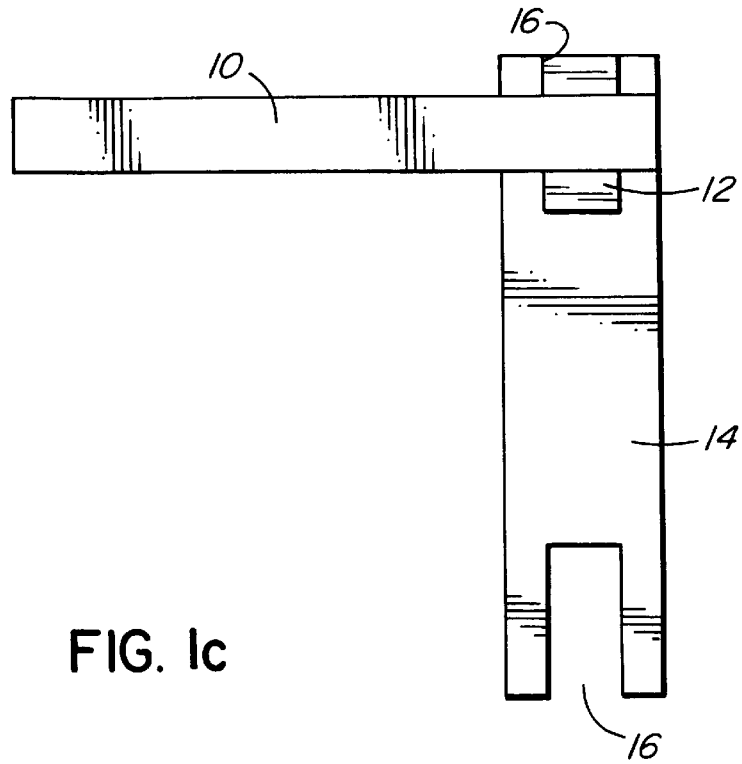

FIGS. 1 through 1c show a joint able to join three members 10, 12 and 14 together. Each member has a channel 16 of a width W generally equal to the thickness T of a member to be joined to it. The length L of the channel is equal to the width M of a member to be joined to it. In the drawings the three members 10, 12 and 14 are of rectangular section and are the same as each other. However this is not a requirement of the present invention.

As shown in FIG. 1 there is a recess 18 in each member 10, 12 and 14 positionable so that, when constructed, the joint has a pathway formed by said recesses 18. A locking member 20 can then be received by said pathway to lock the joint.

The locking member 20 is a rod or pin having a head 22 to control the depth of insertion and to facilitate removal of the member 20 when it is required to dismantle the joint. FIG. 1 shows a joint in which pin 20 can pass right through the joint. That is there are recesses 18 on opposed sides of channel 16—note especially member 14.

To form the joints of FIG. 1 channels 16 of appropriate dimensions are formed in the members 10, 12 and 14. The joint may be constructed and a pathway formed by drilling at an appropriate angle through the joint into a central chamber (not shown) formed at the centre of the joint by the three cooperating channels 16. The presence of the chamber means that the pathway may be formed with great ease. The artisan will always know that the pathway has been formed into the central chamber by feeling the drill enter the chamber. Furthermore it also means that the length of the pin is largely immaterial. There is substantial leeway and the only important part of the locking is where the member 20 contacts the recess 18 in each member 10, 12 and 14 to lock the members together.

When the locking member 20 passes all the way through the joint the first part of the pathway stabilizes the drill as the second part of the pathway is drilled.

Such a joint may be assembled and dismantled with great ease. If it is not wished to dismantle the joint then the head 22 on the member 20 is superfluous. Similarly in those circumstances the joint may be glued together and the locking member 20 also glued in place but that, in general, is unnecessary.

Figure 2:
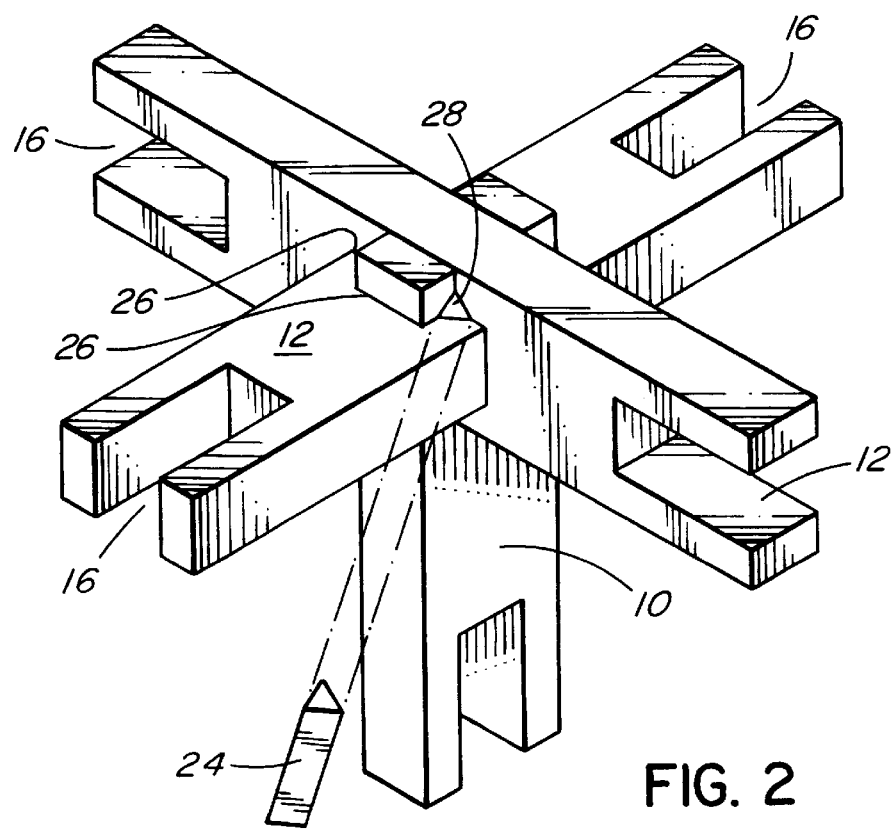
FIG. 2 is an isometric view of a further embodiment of a joint according to the invention.

FIG. 2 illustrates a further embodiment of the invention. In general common reference numerals are used to common parts in FIGS. 1 and 2. FIG. 2 differs by the provision of a locking member 24 of triangular section and by the formation of closed channels 26 in members 12 and 14. Closed channels 26 may be contrasted with the three sided channels 16 shown in FIG. 1 and shown at the ends of all members 10, 12 and 14 in FIG. 2. In general a disadvantage with the triangular locking 24 member is that it is more difficult to form than the pin shown in FIG. 1. Furthermore the recesses are more difficult to form than the simple arcuate recesses 18 of FIG. 1. FIG. 2 shows pathway 28; the equivalent circular pathway is not shown in FIG. 1 as it is an exploded view.

The construction of the joint in FIG. 2 is again simple. In general members 12 and 14 will be joined and the third member 10 then pushed into position shown in FIG. 2. Locking member 24 is then pushed into pathway 28. Pathway 28 may, as in FIG. 1, extend right through the joint.

Figure 3:
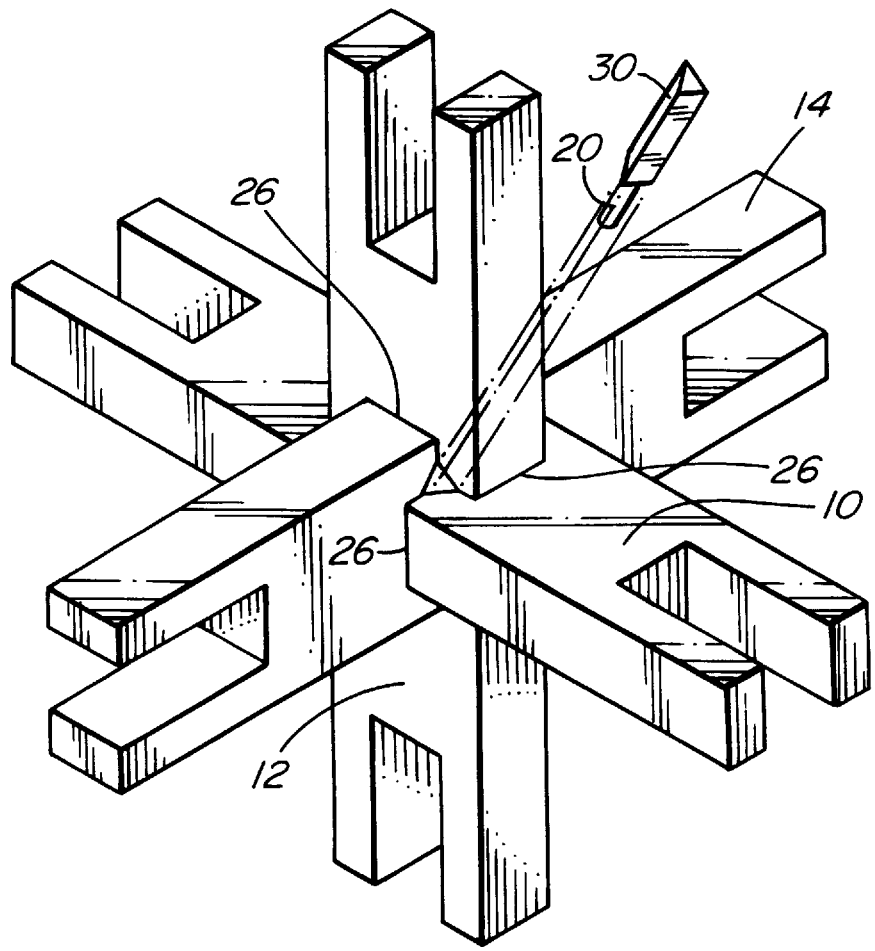
FIG. 3 is an isometric view of a further embodiment of the joint according to the present invention.

FIG. 3 illustrates a further variation in which each member 10, 12 and 14 has a central recess 26. That is the joint of FIG. 3 is the same as that of FIG. 2 with the exception that member 10 also has a central recess 26 and locking member 20 has a triangular head 30.

Figure 4:
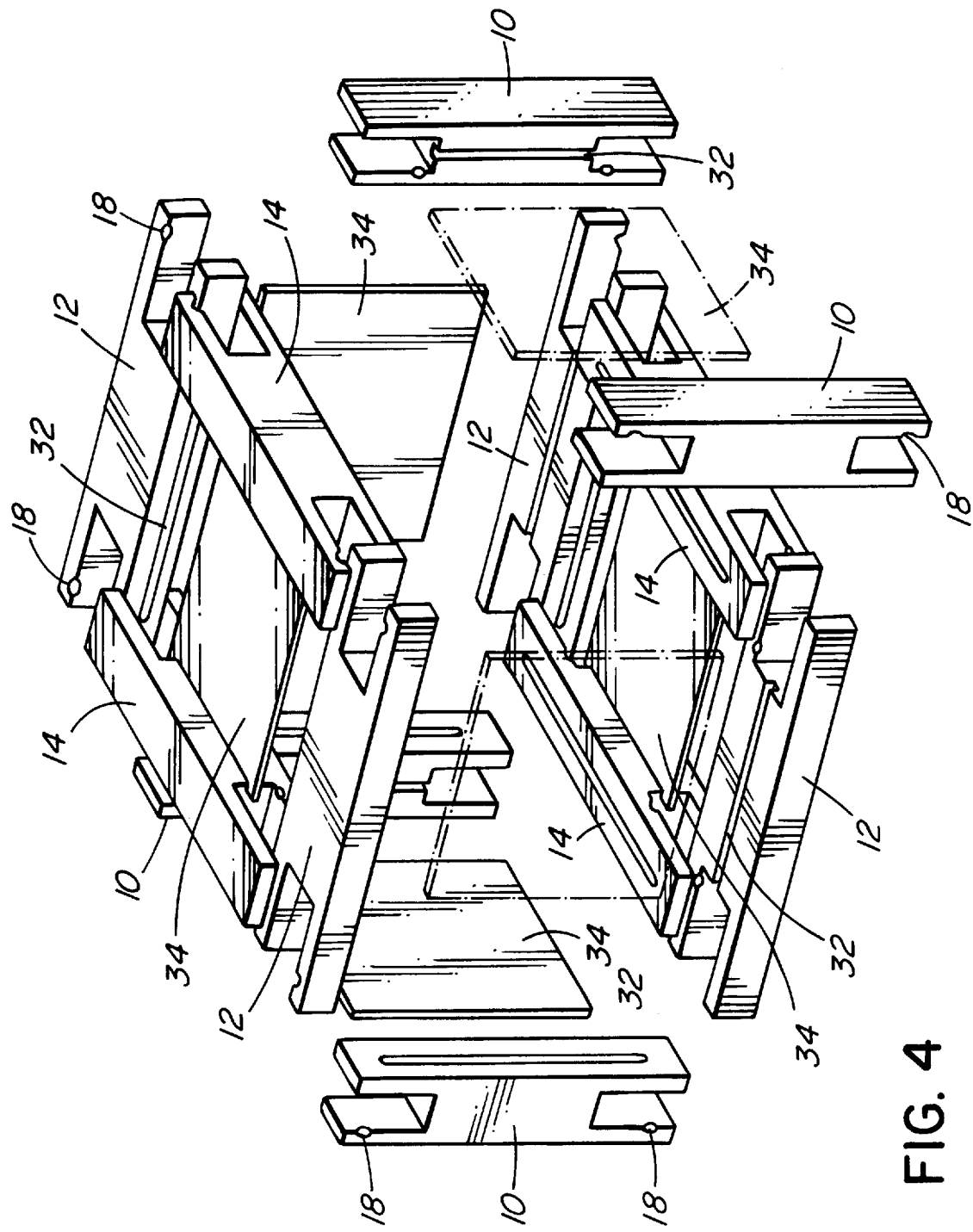
FIG. 4 is an isometric, exploded view of a modular structure produced using a joint according to the present invention.

FIG. 4 illustrates an embodiment of the invention in which each corner of the structure has the joint of FIG. 1. FIG. 4 is a simple cube. Each member 10, 12 and 14 is formed with a channel 32 that receives a panel 34. The panel 34 may be opaque, for example in the manufacture of a packing case, or may be diaphanous in, for example, a display case.

Figure 5:
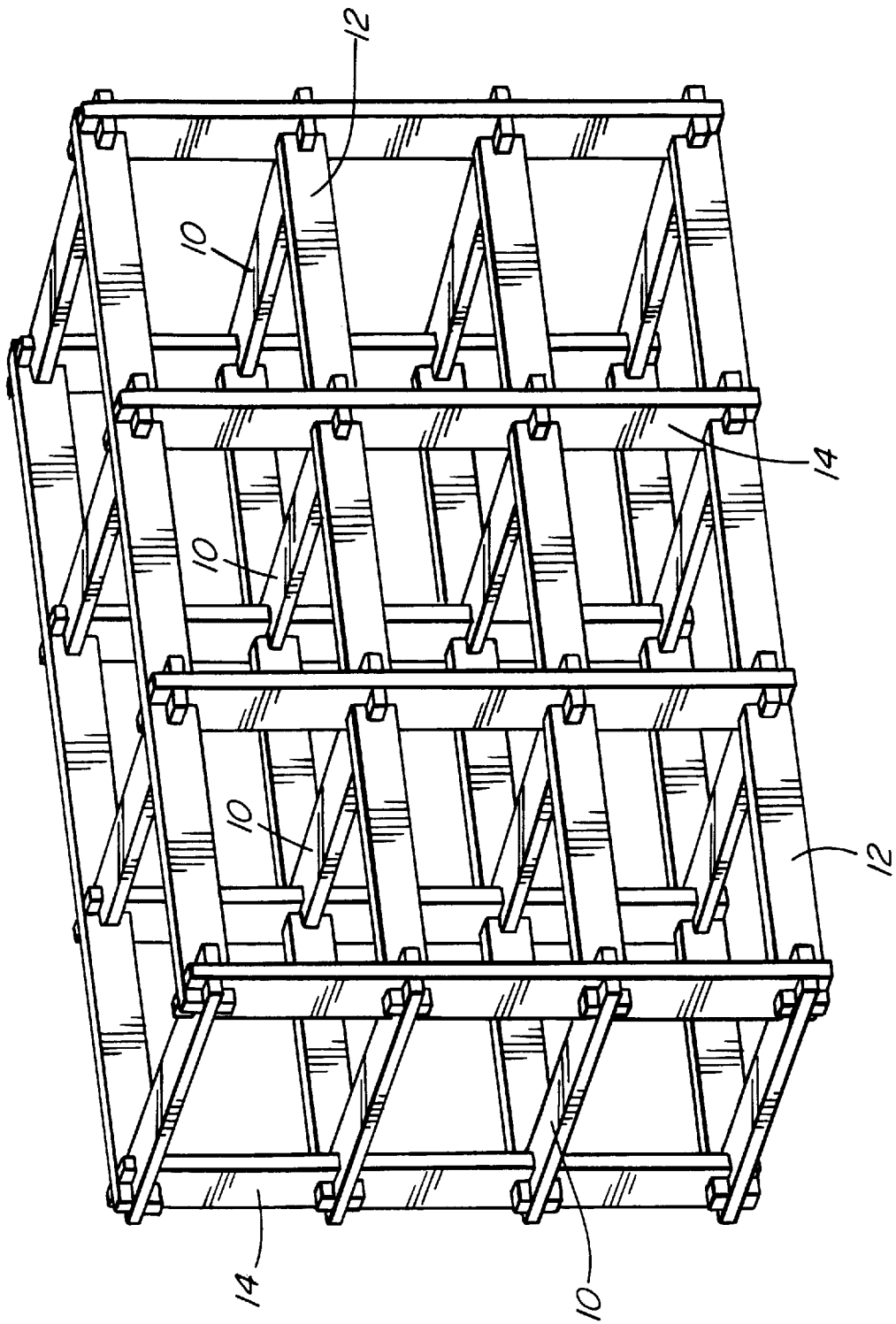
FIG. 5 is an isometric view of a further modular structure formed using a joint according to the present invention.

FIG. 5 illustrates a modular, three dimensional structure using a plurality of joints as shown in FIGS. 1 and 2. In FIGS. 4 and 5 the locking members 20 are not shown and in FIG. 5 the passageways 28 are not shown. The structure is made up of a plurality of cells or modules. Additional cells may easily be added.

The present invention thus provides a joint that is visually appealing, easy to form and has excellent stability. The joint can be easily dismantled if that is desired.

The drawings show members 10, 12 and 14 of rectangular section but, in general, the members need not be rectangular. However areas of rectangular cross-section must be formed where a joint is to be formed. Similarly locking members 20 of circular and triangular cross-section have been shown but there is no reason to restrict the shape. It is only necessary for the locking member 10 cooperate with all three members of the joint. The central chamber in the joint may be filled, if desired.

The joint is of particular application in joining wooden members but metal, plastic and laminate may also be used. The members may be molded, for example, if of plastic.

Although the present invention has been described in some detail by way of illustration and example for purposes of clarity and understanding, it will be readily apparent to those of ordinary skill in the art in light of the teachings of this invention that certain changes and modifications may be made thereto without departing from the spirit or scope of the appended claims.

I claim:

1. A joint for joining three members, the joint comprising: three members wherein each of said three members has at least one channel of a width generally equal to the thickness of another of the three members to be joined thereto and a length generally equal to the width of another of the three members to be joined thereto, the three members interengaging with each other via the channels;

a recess in each member positioned so that the recesses cooperate to define a pathway that simultaneously intersects all three members; and a locking member inserted in the pathway to lock the joint.

2. A joint as claimed in claim 1 in which the three members have generally the same width and thickness.

3. A joint as claimed in claim 1 in which the recesses are arcuate and cooperate to form a circular pathway.

4. A joint as claimed in claim 3 in which the locking member is of circular section and has a head.

5. A joint as claimed in claim 1 in which the members are of rectangular section.

6. A joint as claimed in claim 1 in which at least one member has a channel intermediate the ends of the at least one member.

7. A joint as claimed in claim 1 in which each channel is adjacent an end of each of the three members.

8. A joint as claimed in claim 1 in which the three members are formed with a groove to receive a panel.

9. A modular, three dimensional structure comprising a plurality of cells with each cell corner being joined by a joint connecting three intersecting side members of each cell wherein each of the three members has at least one channel of a width generally equal to the thickness of another of the three members to be joined thereto and a length generally equal to the width of another of the three members to be joined thereto, the three members interengaging with each other via the channels, a recess in each member positioned so that the recesses cooperate to define a pathway that simultaneously intersects all three members, and a locking member inserted in the pathway to lock the joint.

10. A joint for joining three members, the joint comprising three members wherein each of said three members has at least one channel of a width generally equal to the thickness of another of the three members to be joined thereto and a length generally equal to the width of another of the three members to be joined thereto, the three members interengaging with each other via the channels;

a partial recess formed in each member and positioned so that the recesses cooperatively define an elongated pathway that simultaneously intersects all three members when all three members are joined; and a locking member inserted in the pathway to lock the joint.

* * * * *